United States Patent
Hodgkins

(10) Patent No.: US 6,203,825 B1
(45) Date of Patent: Mar. 20, 2001

(54) METHOD AND COMPOSITION TO PROTECT AN OBLIGATE CARNIVORE FROM A DISEASE OF ABNORMAL CARBOHYDRATE METABOLISM

(75) Inventor: Elizabeth Hodgkins, Yorba Linda, CA (US)

(73) Assignee: Heska Corporation, Fort Collins, CO (US)

( * ) Notice: Subject to any disclaimer, the term of this patent is extended or adjusted under 35 U.S.C. 154(b) by 0 days.

(21) Appl. No.: 09/387,809

(22) Filed: Sep. 1, 1999

Related U.S. Application Data

(60) Provisional application No. 60/098,911, filed on Sep. 2, 1998.

(51) Int. Cl.⁷ ............................................. A23K 1/18
(52) U.S. Cl. ........................ 426/2; 426/601; 426/656; 426/658; 426/661; 426/805
(58) Field of Search ......................... 426/2, 658, 656, 426/661, 601, 805

(56) References Cited

U.S. PATENT DOCUMENTS

| | | | |
|---|---|---|---|
| 3,930,031 | * 12/1975 | Kealy | 426/89 |
| 5,932,258 | * 8/1999 | Sunvold | 426/2 |
| 6,013,622 | * 1/2000 | Bruno et al. | 514/2 |

OTHER PUBLICATIONS

Moser, Compendiance on Continuing Education for the Practicing Veterinarian, vol. 13(4), pp. 607–611, 1991.*

Ihle, S.L., 1995, *Vet Clin N Am Sm Anim Prac*, vol. 25, No. 3, pp. 585–597.

Nelson, R.W., 1992, *J Sm Anim Pract*, vol. 33, pp. 213–217.

Rand, Jacquie S., "Pathogenesis of Feline Diabetes", pp. 83–95, from *Recent Advances in Canine and Feline Nutrituion*, vol. II, 1998 Iams Nutrition Symposium Proceedings.

Link et al., Abstract No. 145, "Glucose Toxicity in Cats," Proc. 14th ACVIM Forum, 767, San Antonio, TX 1996.

Morris et al., "Comparative aspects of nutrition and metabolism of dogs and cats," pp. 35–66, presented at Watham Symposium, No. 7, Cambridge University Press, 1989.

Rogers et al., "Why Does the Cat Require a High Protein diet?", *Nutrition of the dog and cat: proceedings of the Internation Symposium on the Nutrition of the Dog and Cat*, Jun. 26, 1978, ed. R.S. Anderson, 1st ed., Oxford; New York: Pergamon Press, 1980, pp. 45–66.

Brand Miller, et al., 1994, *Diabetologia 37*, pp. 1280–1286.

Curry, et al., 1982, *Comp. Biochem. Physiol.*, vol. 72A, No. 2, pp. 333–338.

Lutz, et al., 1997, *J. Comp. Path. 116*, pp. 157–170.

Lutz et al., 1993, *Br. vet. J. 149*, pp. 527–536.

Lutz, et al., 1995, *Bet. Clinics of North America: small animal practice* 25(3), pp. 527–549.

MacDonald, et al., 1984, *Ann Rev. Nutr. 4*, pp. 521–562.

Panciera, et al., 1990, *Javma* 197(11), pp. 1504–1508.

Rand, J.S., 1997, *Aust. Vet. Practit. 27*(2), pp. 68–78.

Rand, et al., 1997, *Aust Vert J 75*(6), pp. 402–405.

Rand, J.S., 1997, *Aust Vet. Practit. 27*(1), pp. 17–26.

Rogers, et al., 1977 *Enzyme 22*, pp. 348–356.

Under, et al., 1985, *Diabetologia 28*, pp. 119–121.

Vondruska, J.F., 1987, pp. 5–9, Companion Animal Practice.

* cited by examiner

Primary Examiner—Chhaya D. Sayala
(74) Attorney, Agent, or Firm—Heska Corporation

(57) ABSTRACT

The present invention includes a method to treat an obligate carnivore for a disease of abnormal carbohydrate metabolism. The method includes the step of feeding the carnivore a nutritionally balanced diet that includes a low carbohydrate content, a high protein content, and a moderate fat content. The present invention also includes such a nutritionally balanced diet and a method to produce such a diet.

21 Claims, No Drawings

METHOD AND COMPOSITION TO PROTECT AN OBLIGATE CARNIVORE FROM A DISEASE OF ABNORMAL CARBOHYDRATE METABOLISM

CROSS REFERENCE TO RELATED APPLICATIONS

This application claims priority to prior pending U.S. Provisional Application Ser. No. 60/098,911, filed Sep. 2, 1998, entitled "METHOD AND COMPOSITION TO PROTECT AN OBLIGATE CARNIVORE FROM A DISEASE OF ABNORMAL CARBOHYDRATE METABOLISM", which is incorporated by reference herein in its entirety.

FIELD OF THE INVENTION

The present invention relates to a method to protect obligate carnivores from a disease of abnormal carbohydrate metabolism, such as diabetes or obesity. In particular, such animals are protected by feeding them a nutritionally balanced diet that includes a high protein content, moderate fat content, and low carbohydrate content.

BACKGROUND OF THE INVENTION

Cats and dogs are the most common companion animals kept by man. As they are both members of the biological order Carnivora, there is a tendency to assume that these two carnivores have similar nutritional requirements. However, there are important differences in the metabolism and nutritional requirements of cats and dogs; see, for example, Morris et al., 1989, in *Waltham Symposium 7, Nutrition of the Dog and Cat* ed. Burger et al., Cambridge University Press, pp. 35–66.

The Feloidae (Felids, Hyaenids, and Viverrids) diverged from the other members of the order Carnivora relatively early in their evolutionary development. In contrast to the Canoidae (Canids, Ursids, Procyonids and Mustelids), all members of the Feloidae are flesh-eaters, i.e. strict or obligate carnivores. A comparison of the nutritional requirements of cats and dogs as representative members of the Feloidae and Canoidae supports the thesis that specialization consistent with the evolutionary influence of a strict carnivorous diet has occurred in cats; see, for example, MacDonald et al., 1984, *Ann. Rev. Nutr.* 4, pp. 521–562. A strict carnivorous diet implies the intake of a high protein, moderate fat, and very low carbohydrate diet, following the composition of prey animals. However, omnivorous species, like dogs, are adapted to both plant and animal food sources. Plants, unlike animals, have high carbohydrate stores in the form of starches.

One adaptation to a strictly carnivorous diet are differences in carbohydrate metabolism. For example, while the feline liver contains hexokinase, the enzyme responsible for the first step in glucose metabolism, it contains no glucokinase, which is a hexokinase that exhibits a significantly higher activity for the specific phosphorylation of glucose. Therefore, cats and other obligate carnivores might not be expected to be well adapted for the ingestion of high carbohydrate meals; see, for example, Morris et al., 1989, ibid. Additionally, the release of insulin from a cat's pancreas (insulin causes the cellular uptake of glucose from the blood) is dissimilar to that observed in most other species, appearing to be less responsive to glucose as a stimulus; see, for example, Curry et al., 1982, *Comparative Biochemistry and Physiology* 72A, pp. 333–338.

Another adaptation to a strictly carnivorous diet relates to the utilization of protein (made up of amino acids) and fat for energy production. Production of glucose from amino acids and fats is called gluconeogenesis. In an omnivore, gluconeogenesis occurs primarily in starvation situations, when the animal needs glucose to fuel its metabolism but can obtain it only from its own muscle protein; see, for example, Zubay, 1993, *Biochemistry*, Addison-Wesley. However, in an obligate carnivore, such as the cat, gluconeogenesis appears to be active at all times in the liver, regardless of nutritional status. Since an obligate carnivore normally has very low intake of carbohydrate, and its carbon sources are primarily protein and fat, it would be expected that the liver would be adapted for use of proteins as its primary source of glucose, rather than carbohydrate. Additionally, it appears that cats, unlike omnivorous species, have limited ability to regulate the catabolic enzymes of amino acid metabolism. Therefore, when cats are fed a low protein diet, a high obligatory nitrogen loss results. Inability to down-regulate breakdown of amino acids accounts for the observed need for a significantly higher protein intake for cats relative to dogs; see, for example, Rogers et al., 1980, in *Nutrition of the Dog and Cat*, ed. R. S. Anderson, Oxford-Permagon Press, pp. 145–156.

Furthermore, cats and other obligate carnivores require animal source foods to meet their requirements for certain nutrients. For example, in contrast to dogs, cats cannot convert carotene from plants to Vitamin A; cats cannot synthesize niacin from tryptophan; cats cannot synthesize arachidonic acid from linoleic acid; and cats cannot synthesize sufficient taurine from cysteine. All of these nutrients can be found in a carnivorous diet; see, for example MacDonald et al., 1984, ibid.

Taken together, these data suggest that obligate carnivores, such as cats, are adapted to the use of protein not only for normal structural development and repair, but also as the primary source of energy via the process of gluconeogenesis.

Despite these metabolic differences between a cat, an obligate carnivore, and a dog, a omnivore, cat food formulations have traditionally been very similar to, and frequently derived from, dog food formulations. It has been known that cats have a higher requirement for protein, so cat food formulations have been modified to include higher concentrations of protein compared to dog foods. However, there have been a number of widespread health problems in cats related to such cat food formulations, demonstrating that food developed for dogs is not optimal for cats. For example, cats began developing heart problems relating to lack of taurine in the diet. Taurine is only obtained from animal source protein since vegetable source protein does not contain taurine. Cats also began developing urinary stones, related to too much magnesium in the diet, and hypokalimia, a condition caused by low dietary potassium; see, for example MacDonald et at., 1984, ibid. and Morris et al., 1989, ibid. Pet food companies have responded by supplementing their formulations to correct these problems caused by deficiencies in their cat food formulations. However, these problems demonstrate that there are very basic differences in dietary requirements between the cat, an obligate carnivore, and the dog, an omnivore, and that these differences are not fully addressed in current cat foods.

Commercial cat foods today contain significant, even very high, levels of dietary carbohydrate from corn, wheat and other cereal grains. Dry formulation cat foods, in general, contain higher levels of grain carbohydrates than do canned varieties.

There has been a recent increase in the incidence of feline obesity and feline diabetes in domesticated cats. Twenty percent of adult pet cats are thought to be obese, and feline diabetes is thought to affect one cat out of every four hundred; Panciera et al, 1990, *JAVMA* 197, pp.1504–1508. Adult-onset diabetes, the most common form in the cat, is almost always insulin dependent and extremely difficult to regulate, even in the face of conscientious care by clinician and owner. The current therapy for feline adult-onset diabetes is administration of insulin. Additionally, for feline obesity, the current therapy is much like that for the treatment of human obesity: it consists of a diet of lower caloric density. Since fat has a higher caloric density than carbohydrate, typically carbohydrate is substituted for fat in order to lower caloric density.

Diabetes mellitus may occur either as a primary disease process or as a secondary complication caused by the destruction of beta cells or insulin resistance due to another disease. In human disease, diabetes is subdivided into type 1 diabetes (insulin dependent, characterized by destruction of the insulin-secreting beta cells of the pancreas) and type 2 diabetes (non-insulin dependent, characterized by insulin resistance). Although there is strong evidence that both types occur in cats, type 2 diabetes appears to be much more frequent, and, in contrast to humans with type 2 diabetes, most cats with type 2 diabetes are insulin dependent; see, for example Lutz et al. 1995, *Diabetes Mellitus* 25, pp. 527–549.

In type 2 diabetes, insulin secretion and insulin resistance are reduced compared to normal animals. For example, in diabetic cats and humans show markedly reduced or absent insulin secretion during the first phase of insulin response after an increase in glucose, and a markedly delayed and often exaggerated insulin secretion during the second phase of the response. Impaired glucose tolerance is relatively common in cats. Additionally, in cats, marked suppression of insulin secretion may occur within days of a cat showing persistent marked hyperglycemia of approximately 540 milligrams (mg) per deciliter (dL) is present; see, for example Lutz et al., 1995, ibid. This phenomenon is called glucose toxicity. In humans, insulin resistance, i.e. a state in which higher insulin concentrations are required to achieve a given amount of glucose uptake and utilization, is determined genetically; however, in cats a predisposition to insulin resistance has not been demonstrated; see, for example, Rand, 1997, *Aust. Vet. Practit.* 27, pp. 17–26.

Diabetes in cats is currently difficult to treat and control. Treatment consists of either oral hypoglycemic drugs or insulin therapy. Sulfonylureas are the most common class of oral hypoglycemic drugs. They act by both increasing insulin secretion from beta cells and the sensitivity of peripheral tissues to insulin, therefore, they are only useful if some functional beta cells are present. Insulin therapy requires careful control and monitoring of blood glucose levels, a challenge to clinician and cat owner. Only 30 to 50% of cats can be managed with oral hypoglycemic drugs. Additionally, approximately 15% of cats with diabetes are transient diabetics, meaning that therapy may be discontinued after several months or weeks; see, for example, Rand, 1997, *Aust. Vet. Practit.* 27, pp. 68–78.

Current thought on perspectives for treating feline diabetes focuses on understanding the role of the hormone amylin and glucagon-like peptide-1. Amylin receptor antagonists are being developed to treat human type 2 diabetics, and are thought to be potentially useful for cats. Glucagon peptide-1 is also thought potentially useful in treating diabetic cats, Lutz et al., 1995, ibid. There remains, however, a need for a better method to protect cats from diseases of abnormal carbohydrate metabolism, including a method to maintain the well-being of such animals.

SUMMARY OF THE INVENTION

The current invention relates to the surprising discovery that feeding a cat a diet including low carbohydrate content, high protein content, and moderate fat content improves that cat's health, or well-being. Such a diet is very similar to the natural diet that obligate carnivores, such as cats, have evolved to eat. This invention addresses all obligate carnivores, including all species from the Feloidae family and obligatory carnivores from the Canoidae family. Since an obligate carnivore is not adapted to carbohydrate in its diet, and furthermore has an inability to regulate its hepatic enzymes as omnivores do, without being bound by theory, the inventor believes that the intake of dietary carbohydrate at levels seen in commercial cat foods would actually be harmful to an animal, causing depletion and/or suppression of insulin, and ultimately causing those most sensitive to these effects to become clinically diabetic. The inventor also believes that obesity in an obligate carnivore, such as the cat, is caused, at least in part, by a high carbohydrate intake. High intake of carbohydrate by an animal adapted to almost exclusive intake of fat and protein appears to cause abnormal regulation of the hormones and enzymes that signal the fed and unfed state to the body. Further, this consumption of carbohydrates with the concomitant increase in circulating insulin causes the energy of the diet to be stored as fat.

The present invention includes a method to protect an obligate carnivore from a disease of abnormal carbohydrate metabolism. The method includes the step of feeding the carnivore a nutritionally balanced diet that includes a low carbohydrate content; a high protein content, preferably animal source protein; and a moderate fat content. In one embodiment, such a diet maintains the health, or well-being, of an obligate carnivore that is in good health. A preferred nutritionally balanced diet comprises a protein content of from about 25% to about 60% on a dry matter basis, a fat content of from about 15% to about 60% on a dry matter basis, and a carbohydrate content of not more than about 12% on a dry matter basis. Another preferred nutritionally balanced diet comprises a protein content of from about 30% to about 70% on a dry matter basis, a fat content of from about 10% to about 40% on a dry matter basis, and a carbohydrate content of not more than about 12% on a dry matter basis. Another preferred nutritionally balanced diet includes animal meat wherein the balance of nutrients in the animal meat approximates the balance of nutrients in a total animal carcass.

The present invention also includes a method to protect an obligate carnivore from a disease of abnormal carbohydrate metabolism that includes the following steps: (a) producing a nutritionally balanced diet comprising a protein content of from about 25% to about 60% on a dry matter basis, a fat content of from about 15% to about 60% on a dry matter basis, and a carbohydrate content of not more than about 12% on a dry matter basis; and (b) feeding such a diet to the obligate carnivore. The present invention also includes a method to protect an obligate carnivore from a disease of abnormal carbohydrate metabolism that includes the following steps: (a) producing a nutritionally balanced diet comprising a protein content of from about 30% to about 70% on a dry matter basis, a fat content of from about 10% to about 40% on a dry matter basis, and a carbohydrate content of not more than about 12% on a dry matter basis; and (b) feeding such a diet to the obligate carnivore.

The present invention also includes such nutritionally balanced diets and methods to produce such diets. A preferred nutritionally balanced diet includes a protein content of from about 25% to about 60% on a dry matter basis, a fat content of from about 15% to about 60% on a dry matter basis, and a carbohydrate content of not more than about 6% on a dry matter basis. Another preferred nutritionally balanced diet includes a protein content of from about 30% to about 70% on a dry matter basis, a fat content of from about 10% to about 40% on a dry matter basis, and a carbohydrate content of not more than about 12% on a dry matter basis.

The present invention also includes a method to protect an obligate carnivore from a disease of abnormal carbohydrate metabolism, comprising feeding the obligate carnivore a nutritionally balanced food composition that comprises a percentage of carbohydrate on a dry matter basis that is not more than the highest percentage of carbohydrate on a dry matter basis that will protect the obligate carnivore from such a disease. In one embodiment, this method also includes feeding any nutritionally balanced food composition that demonstrates a similar protective effect as a food composition comprising animal meat wherein the balance of nutrients in said animal meat approximates the balance of nutrients in a total animal carcass.

The present invention also includes a method to maintain the health of a healthy obligate carnivore, said method comprising feeding the carnivore a nutritionally balanced food composition that comprises a percentage of carbohydrate on a dry matter basis that is not more than the highest percentage of carbohydrate on a dry matter basis that will maintain the health of the carnivore. In one embodiment, the method includes feeding the carnivore a nutritionally balanced food composition that demonstrates the same protective effect as a food composition comprising animal meat wherein the balance of nutrients in said animal meat approximates the balance of nutrients in a total animal carcass.

DETAILED DESCRIPTION OF THE INVENTION

The present invention includes a method to protect obligate carnivores, such as cats, from a disease of abnormal carbohydrate metabolism. This method includes the step of feeding the obligate carnivore a nutritionally balanced diet comprising a high protein, moderate fat, and low carbohydrate content. In one embodiment, the diet maintains the health, i.e., the well-being, of an obligate carnivore that is in good health, i.e., an animal that is not suffering from a disease of abnormal carbohydrate metabolism prior to being fed a diet of the present invention. Also included in the present invention are such nutritionally balanced diets.

As used herein, an obligate, or strict, carnivore is an animal that requires meat (i.e., animal flesh) in its diet. Such an animal can also eat other foods, but needs an animal source of protein, or supplements thereof, and preferably an animal source of fat, or supplements thereof, in order to maintain its health, i.e., well-being. Preferred obligate carnivores to feed in accordance with the present invention are Feloidae (e.g., Felids, Hyaenids, and Viverrids), as well as those Canoidae that are obligate carnivores (e.g., obligately carnivorous Mustelids). Preferred genera include, but are not limited to, Felis, Panthera, Puma, Crocuta, Hyaena and Putorius, with the following species being even more preferred: *Felis domesticus, Felis silvestris, Panthera leo, Panthera tigris, Panthera pardus, Puma concolor, Crocuta crocuta, Hyaena hyaena* and *Putorius furo*. It is to be noted that the terms Feloidae and cats are used interchangeably herein.

In one embodiment, the present invention relates to a treatment for feline adult-onset diabetes mellitus, a disease affecting as many as one out of every four hundred cats, by feeding a nutritionally balanced diet comprising a very low carbohydrate content, a high protein content and a moderate fat content. While not being bound by theory, the inventor believes that the intake of dietary carbohydrate at levels commonly seen in commercial cat foods can be harmful to the cat, for example by causing depletion and or suppression of insulin secretion, ultimately causing those animals most sensitive to these effects to become clinically diabetic. This idea is new and surprising, since the belief in the pet food formulation art is that the amount of carbohydrate present in the diet is not important, as long as sufficient amounts of vital nutrients, such as protein, fat, trace minerals, vitamins and amino acids are present. Most formulations for adult cats contain high amounts of carbohydrate; see Table 1.

TABLE 1

Protein, fat, and carbohydrate contents of selected commercial cat foods, on a dry matter basis

| Brand | Name of diet | formulation | % protein | % fat | % carbohydrate | % fiber |
|---|---|---|---|---|---|---|
| Ralston-Purina | CAT CHOW | dry | 37 | 13.2 | 40.3 | 1.7 |
| Ralston-Purina | KITTEN CHOW | dry | 41 | 13.8 | 35.5 | 1.8 |
| Ralston-Purina | CAT CHOW MATURE | dry | 36.8 | 9.7 | 40.1 | 1.7 |
| Ralston-Purina | O.N.E. CHICKEN AND RICE FORMULA FOR CATS | dry | 34.4 | 15.5 | 41.5 | 1.4 |
| Ralston-Purina | O.N.E. CHICKEN AND RICE FORMULA FOR KITTENS | dry | 39.1 | 18.4 | 37.2 | 1.4 |
| Ralston-Purina | PRO PLAN CAT GROWTH FORMULA | dry | 36.5 | 22.7 | 34.5 | 1.2 |
| Ralston-Purina | PRO PLAN CAT ADULT FORMULA | dry | 34.2 | 16.6 | 38.3 | 1.4 |
| Ralston-Purina | PRO PLAN CAT LITE FORMULA | dry | 34.8 | 9.4 | 40.1 | 2.5 |
| Ralston-Purina | PRO PLAN TURKEY AND BARLEY FORMULA FOR CATS | dry | 35.8 | 18.9 | 34.8 | 2.4 |
| Hill's | PRESCRIPTION DIET FELINE C/D | dry | 34.5 | 16.3 | 42.7 | 0.79 |
|  |  | wet | 43.4 | 21.8 | 25.1 | 3.2 |
| Hill's | PRESCRIPTION DIET FELINE D/D | wet | 39 | 28.1 | 26.2 | 1.5 |

TABLE 1-continued

Protein, fat, and carbohydrate contents of selected commercial cat foods, on a dry matter basis

| Brand | Name of diet | formulation | % protein | % fat | % carbohydrate | % fiber |
|---|---|---|---|---|---|---|
| Hill's | PRESCRIPTION DIET FELINE H/D | wet | 43.4 | 26.7 | 23.2 | 0.3 |
| Hill's | PRESCRIPTION DIET FELINE R/D (for obese cats) | dry | 37.7 | 8.4 | 31.5 | 16.7 |
|  |  | wet | 36.2 | 7.7 | 20.9 | 29.8 |
| Hill's | PRESCRIPTION DIET FELINE W/D | dry | 39.2 | 9.5 | 36.5 | 9.0 |
|  |  | wet | 41.1 | 16.6 | 23.7 | 12.3 |
| Hill's | HEALTH BLEND KITTEN | dry | 36.1 | 23.7 | 32.7 | 1.1 |
|  |  | wet | 43.2 | 33.1 | 16.6 | 0.6 |
| Hill's | HEALTH BLEND FELINE | dry | 32.7 | 20.2 | 41.2 | 1.1 |
|  |  | wet | 41.1 | 22.3 | 28.7 | 1.0 |
| Hill's | HEALTH BLEND FELINE GERIATRIC | dry | 33.3 | 18.6 | 41.1 | 1.7 |
|  |  | wet | 41.2 | 20.6 | 28.8 | 4.1 |
| Hill's | SCIENCE DIET FELINE GROWTH | dry | 37.1 | 26.8 | 29.1 | 1.2 |
|  |  | wet | 49 | 36.2 | 6.9 | 0.6 |
| Hill's | SCIENCE DIET FELINE MAINTENANCE | wet | 45.2 | 25.2 | 20.1 | 2.5 |
|  |  | dry | 33.8 | 23 | 40 | 0.9 |
| Hill's | SCIENCE DIET LIGHT FORMULA FELINE MAINTENANCE | dry | 40.8 | 9 | 35.6 | 8.4 |
|  |  | wet | 44.9 | 12 | 27.8 | 9.2 |

Until the present invention, diabetic cats have typically been treated with either oral hypoglycemic drugs or exogenous insulin, and it had been thought that food intake had little effect on blood glucose in diabetic cats; see, for example, Martin et al, 1997, In *Proceedings of 15$^{th}$ American College of Veterinary Internal Medicine*, p 670. The idea of treating diabetes by modifying the diet to remove most of the carbohydrate is new, and finding that blood glucose levels in diabetic cats are lowered when treated in accordance with the present invention is unexpected.

Another embodiment of the present invention relates to the treatment of feline obesity, an epidemic affecting as many as 20% of domestic cats, by feeding obese cats a nutritionally balanced diet comprising a very low carbohydrate, high protein and moderate fat content. Until the present invention, obesity in cats has been treated in a similar manner to treating obesity in humans, by, for example, lowering the caloric density of the diet by increasing the amount of carbohydrate in the diet and lowering fat content. However, the cat's satiety response, as an obligate carnivore, is related to the amount of protein and fat the cat eats. Carbohydrate is not a natural dietary component in the cat's diet, so it would follow that carbohydrate will not provide the cat with a feeling of satiety. Thus, the cat is hungry and will overeat, causing weight gain. In accordance with the present invention, a diet that contains moderate fat, with high animal protein content and low carbohydrate content, will be more effective at triggering the cat's satiety response, allowing it to maintain a more normal weight. The lower carbohydrate level of this diet will also result in lower levels of circulating insulin and less tendency to store dietary energy as fat.

It is to be noted that low carbohydrate diets currently exist in canned formulations only, and they are designed and positioned exclusively for the short term feeding of kittens. No such diet is claimed to be efficacious for the management and cure of feline diabetes mellitus, obesity, or other diseases of abnormal carbohydrate metabolism. Rather, the diets positioned as "diabetes diets" for cats have a high-fiber, moderate protein, moderate carbohydrate, and low fat profile that mimics the diets used to manage diabetes mellitus in dogs. In fact, no definitive research into the unique characteristics of feline diabetes and the resulting dietary implications has been done. Rather, what is believed and known about management of canine diabetes has been applied to cats, despite vast differences in the metabolism of obligate carnivores, such as cats, and omnivores, such as dogs. Thus, the invention of using a low carbohydrate diet with high protein and moderate fat to manage, cure, and prevent a disease of abnormal carbohydrate metabolism is different and new.

One embodiment of the present invention is a method to protect an obligate carnivore from a disease of abnormal carbohydrate metabolism by feeding the obligate carnivore a nutritionally balanced diet that includes a low carbohydrate, high protein and moderate fat content. As used herein, to protect from a disease means to prevent, control, cure, ameliorate or reduce the severity of said disease. In accordance with the present invention, to protect also includes to maintain the health, i.e., well-being, of an animal. It is to be noted that the term "a" or "an" entity refers to one or more of that entity; the terms "comprising", "including", and "having" can be used interchangeably. It should also be noted that the phrase "selected from the group consisting of" means any one or any combination of the members of the group.

Feeding includes food given orally as well as nutrition delivered by other routes, including, but not limited to, intravenous administration.

Nutrient on a dry matter basis is defined as the nutrient amount in a food composition after essentially all moisture is removed. Converting percent nutrients in a food composition to percent dry matter content is used to make direct comparisons of nutrient profiles of products with differing moisture contents. The term nutrient includes any ingredient that has a nutritive value for an animal, and includes the protein component, the fat component, and the carbohydrate component of a pet food as well as any other component(s) that is (are) necessary and/or is (are) thought to be necessary for the animal's health.

The term nutritionally balanced diet as used herein means a composition that, when fed as the sole source of food to an animal, contains sufficient kinds and amounts of nutrients to maintain an animal's health, i.e., well-being, over the course of the animal's life. A nutritionally balanced diet of the present invention includes a high protein content, a moderate fat content and a low carbohydrate content, each of which is described in more detail below. Such a nutritionally balanced diet also includes sufficient quantities of other ingredients, such as vitamins, minerals, amino acids, salts, and the like to maintain an animal's good health; appropriate ingredients and sufficient amounts to include in a nutritionally balanced diet are known to those skilled in the art. Examples of such ingredients include, but arc not limited to, sodium chloride, potassium chloride, potassium citrate, calcium carbonate, iodized salt, choline chloride, taurine, iron oxide, zinc oxide, ferrous sulfate, copper sulfate, manganous oxide, sodium selenite, calcium iodate, vitamin E supplement, thiamine, niacin, calcium pantothenate, pyridoxine hydrochloride, riboflavin, folic acid, biotin and vitamin B 12 supplement. Other ingredients may be added in this composition as desired; such additives include flavoring agents, coloring agents, inorganic compounds, and fillers. A filler, or bulking agent, is defined as an ingredient that by addition to the composition, brings the composition to a one hundred percent composition. A filler or bulking agent comprises a non-digestible component, examples of which include, but are not limited to, non-digestible proteins, non-digestible fats, or non-digestible carbohydrates. Non-digestible carbohydrate is also known as fiber, examples of which include, but are not limited to, cellulose, peanut hulls, and soy fiber.

A disease of abnormal carbohydrate metabolism is a disease brought about by a concentration of carbohydrate in the blood which is sufficient to cause disease in an obligate carnivore. That is, the concentration of carbohydrate in the blood, typically measured as the blood glucose concentration, or blood glucose level, is abnormally high, thereby leading to disease. A blood glucose concentration of from about 90 mg glucose per dL blood to about 110 mg glucose per dL blood is considered normal in a cat. As such, blood glucose concentrations of greater than about 150 mg glucose per dL blood are considered indicators of an animal either having a disease of abnormal carbohydrate metabolism or being susceptible to such a disease. Since an obligate carnivore has evolved to exist on a diet composed of very low carbohydrate, the amount of carbohydrate the animal can tolerate before an abnormality, manifested as a disease, is lower than what is tolerated by an animal that is not adapted to exist on a very low carbohydrate diet. Examples of diseases of abnormal carbohydrate metabolism include, but are not limited to, diabetes and obesity.

The amount of carbohydrate present in a nutritionally balanced diet of the present invention is of key importance and should be sufficiently low so as not to cause, or lead to, a disease of abnormal carbohydrate metabolism in the fed animal. In one embodiment, the amount of carbohydrate in an obligate carnivore's diet, and preferably in a cat's diet, on a dry matter basis, preferably is less than about 20% carbohydrate. More preferred is a concentration less than about 15% carbohydrate, even more preferred is a concentration of less than about 12% carbohydrate, even more preferred is a concentration of less than about 10% carbohydrate, even more preferred is a concentration of less than about 8% carbohydrate, even more preferred is a concentration of less than about 6% carbohydrate, even more preferred is a concentration of less than about 5% carbohydrate, even more preferred is a concentration of less than about 4% carbohydrate, and even more preferred is a concentration of about 2% or less carbohydrate. In one embodiment, no carbohydrate is added to the cat's diet.

Carbohydrates can be understood to be monosaccharides, oligosaccharides, and/or high molecular weight polysaccharides. Monosaccharides are defined as any of a class of aldehyde or ketone derivatives of polyhydric alcohols, particularly of the pentahydric and hexahydric alcohols. Common monosaccharides include glucose, fructose, galactose, and mannose. Most carbohydrates in nature exist as polysaccharides, which are high molecular weight oligomers of monosaccharides linked by glycosidic bonds. Ingested polysaccharides are broken down into their component monosaccharides by enzymes that are specific for that particular polysaccharide. Carbohydrate may be supplied in the form of vegetable starches, which can include but are not limited to cereal grains such as wheat, corn, barley and rice.

The protein components used to prepare the nutritionally balanced diet with high protein content can be supplied by ingredients such as animal source protein, including but not limited to meat and meat by-products; plant protein sources supplemented with essential amino acids, such as taurine, and/or other protein-related nutrients, as needed, in an amount to be nutritionally balanced; or a combination thereof. By meat is meant the flesh of an animal, such as, but not limited to, cattle, swine, sheep, goats, horses, other hoofed-animals, other mammals, poultry, fish, and arthropods. Meat by-products include, but are not limited to, lungs, kidneys, brain, livers, and stomachs and intestines freed of their contents. Preferred is a nutritionally balanced diet in which the protein ingredients are derived at least in part from animal source protein; more preferred is a nutritionally balanced diet in which the protein ingredients are derived completely from animal source protein. A preferred nutritionally balanced diet of the present invention is one in which the protein content, on a dry matter basis, ranges from about 25% to about 70% protein, more preferably from about 30% to about 60% protein, more preferably from about 40% to about 55% protein, and even more preferably from about 48% to about 52% protein.

The fat in a nutritionally balanced diet of the present invention is one or more triacylglycerols of fatty acids, and may be derived from an animal source of fat; a plant source of fat supplemented, as needed, with essential fatty acids or fat-associated or related nutrients, for example arachidonic acid, in an amount to be nutritionally balanced; or a combination of animal source fat and vegetable source fat. Preferred is a nutritionally balanced diet wherein the fat ingredients are derived at least in part from animal source fat; and more preferred is a nutritionally balanced diet in which the fat ingredients are derived completely from animal source fat. A preferred nutritionally balanced diet of the present invention is one in which the fat content, on a dry matter basis, ranges from about 15% to about 60% fat, more preferably from about 25% to about 50% fat, more preferably from about 30% to about 45% fat, and even more preferably from about 35% to about 40% fat.

One aspect of the present invention is a method to protect an obligate carnivore from a disease of abnormal carbohydrate metabolism which comprises feeding the obligate carnivore a nutritionally balanced diet of animal meat. Such animal meat has a nutrient balance that approximates (i.e., similar to) the balance of nutrients in a total animal carcass. An embodiment of this diet is a diet comprising whole ground rat carcasses. A whole ground rat carcass diet can be prepared by sacrificing adult rats, removing the gastrointestinal contents, and grinding the carcasses. This diet may be canned, refrigerated or frozen prior to feeding to the animal or fed fresh to the animal.

One embodiment of the present invention is an animal food composition comprising a nutritionally balanced diet. A preferred nutritionally balanced diet includes a protein content of from about 25% to about 60% on a dry matter basis, a fat content of from about 15% to about 60% of a dry matter basis, and a carbohydrate content of not more than about 12%, more preferably of not more than about 10%, more preferably of not more than about 8%, more preferably of not more than about 6%, more preferably of not more than about 5%, more preferably of not more than about 4%, and even more preferably of not more than about 2% carbohydrate on a dry matter basis. Another preferred nutritionally balanced diet includes a protein content of from about 30% to about 70% on a dry matter basis, a fat content of from about 10% to about 40% of a dry matter basis, and a carbohydrate content of not more than about 12%, more preferably of not more than about 10%, more preferably of not more than about 8%, more preferably of not more than about 6%, more preferably of not more than about 5%, more preferably of not more than about 4%, and even more preferably of not more than about 2% carbohydrate on a dry matter basis. Another preferred nutritionally balanced diet is animal meat, such as a total animal carcass. Such compositions have utility in maintaining the health, or well-being, of an animal as well as for treating, curing, controlling or reducing disease in an animal as disclosed herein.

The present invention also includes a method to produce nutritionally balanced diets of the present invention. Such diets can be prepared as wet diets, which are typically canned, or dry diets, which are typically packaged in containers, such as bags. As used herein, a wet diet refers to any diet which is not a dry diet. Wet food diets of the present invention are produced using methods known to those skilled in the art. For example, wet food can be produced by mixing the desired ingredients with water sufficient for processing. In one embodiment, the mixture is typically heated in a suitable vessel to a temperature of from about 70° F. to about 140° F. When heated to the appropriate temperature, the mixture is in the form of a thick liquid or paste. The thick liquid or paste is then placed into cans, lids are applied, and the cans are hermetically sealed. The sealed can is then sterilized using any of a variety of methods known to those skilled in the art, such as by heating the can to about 230° F. for an appropriate length of time.

Until the present invention, dry cat foods contained, on average, a significantly higher amount of carbohydrate on a dry weight basis than wet cat food, and, indeed, the inventor is unaware of any commercial dry cat food formulation that contains a nutritionally balanced diet of the present invention. While not being bound by theory, it is believed that carbohydrate (e.g., starch) was added to facilitate the extrusion process by which currently commercial dry cat food is typically formulated after baking with steam and pressure. There is, however, no reason to expect that it would be difficult to make a dry animal food composition comprising a nutritionally balanced diet of the present invention using methods known to those skilled in the art, including, but not limited to, drying (e.g., by baking) and extrusion. In one embodiment, a dry diet of the present invention is prepared by a process of slowly drying and baking a wet diet of the present invention; for example, the wet diet preparation is placed in a heated oven, for example an oven at 225° F., for a sufficient amount of time to dry the wet preparation. The preparation is uncovered throughout this process, and is stirred as necessary during the drying process. After drying is complete, the mixture is cooled before being packaged. The resultant dry nutritionally balanced diet has a moisture content of about 10%, compared to a starting moisture content of between 25% and 35%.

The present invention also includes a method to protect an obligate carnivore from a disease of abnormal carbohydrate metabolism that includes the step of feeding the obligate carnivore a nutritionally balanced food composition that comprises a percentage of carbohydrate on a dry matter basis that is not more than the highest percentage of carbohydrate on a dry matter basis that will protect said obligate carnivore from said disease of abnormal carbohydrate metabolism. In one embodiment, the method includes a food composition that has a similar protective effect as a food composition comprising animal meat wherein the balance of nutrients in said animal meat approximates the balance of nutrients in a total animal carcass.

The present invention also includes a method to maintain the health of a healthy obligate carnivore that includes the step of feeding the carnivore a nutritionally balanced food composition that comprises a percentage of carbohydrate on a dry matter basis that is not more than the highest percentage of carbohydrate on a dry matter basis that will maintain the health of said healthy obligate carnivore. In one embodiment, the method includes a nutritionally balanced food composition that has a similar health maintenance effect as a food composition comprising animal meat wherein the balance of nutrients in said animal meat approximates the balance of nutrients in a total animal carcass.

The following examples are provided for the purposes of illustration and are not intended to limit the scope of the present invention.

EXAMPLES

Example 1

This Example demonstrates the ability of a nutritionally balanced diet of the present invention to treat a disease of abnormal carbohydrate metabolism in a cat.

A 9-week study was performed on an eight year old domestic shorthair cat with adult-onset, insulin dependent diabetes. This cat developed the clinical signs of diabetes mellitus at the age of five years. This cat, as an adult, had been fed commercial diets with high levels of carbohydrate; i.e., HILL'S SCIENCE DIET FELINE MAINTENANCE and HILL'S SCIENCE DIET FELINE LIGHT. This cat required treatment with insulin (ULTRA LENTE insulin SQ) to lower its blood glucose levels to a more normal range. However, as is common with cats with feline diabetes mellitus, this cat's disease was difficult to control. Frequent testing and careful titration of the cat's insulin dosage was required; even with these precautions, on two occasions, the cat lapsed into diabetic ketoacidosis, a complication caused by hyperglycemia.

At week 0 of the present study, the cat's diet was switched to a low carbohydrate, high meat protein, moderate fat diet. The diet, referred to herein as DIET 1, is a wet food formulation with 7% carbohydrate, 49% protein, and 36% fat on a dry matter basis. DIET 1, on a wet matter basis, has about 13% crude protein, 8% crude fat, 3.5% ash, 1% crude fiber, 0.25% calcium, 0.2% phosphorus, 0.1% taurine, 0.04% magnesium and 72% moisture. At the time this diet began, this cat was being dosed with approximately 4 units of insulin every 12 hours. Dosage was adjusted over the course of this study in response to measured blood glucose level, with dosage being lowered by a half unit every day that the blood glucose was determined to be below 100 mg/dL. Table 2 shows the blood glucose levels and insulin dosage for the cat fed the low carbohydrate diet over a period of 66 days.

TABLE 2

Blood glucose levels and insulin dosage for treated cat

| DAY | DATE | Time | Glucose level | insulin dosage |
|---|---|---|---|---|
| 0 | 5/25/1998 | 5:00 pm | 230 mg/dL | 3.5 units BID |
| 4 | 5/29/1998 | 6:00 pm | 200 mg/dL | 3.5 units BID |
| 9 | 6/3/1998 | 5:16 pm | 180 mg/dL | 3.0 units BID |
| 11 | 6/5/1998 | 5:00 pm | 90 mg/dL | 2.5 units BID |
| 13 | 6/7/1998 | 5:30 pm | 70 mg/dL | 2.0 units BID |
| 15 | 6/9/1998 | 5:30 pm | 30 mg/dL | 1.0 unit BID |
| 20 | 6/14/1998 | 6:00 pm | 100 mg/dL | 0.5 unit BID |
| 27 | 6/21/1998 | 5:00 pm | 68 mg/dL | 0.0 unit BID |
| 29 | 6/23/1998 | 6:00 pm | 110 mg/dL | 0.0 unit BID |
| 36 | 6/30/1998 | 6:00 pm | 324 mg/dL | 1.0 unit BID |
| 38 | 7/2/1998 | not record. | 30 mg/dL | 0.0 unit BID |
| 54 | 7/18/1998 | 12:00 pm | 103 mg/dL | 0.0 unit BID |
| 60 | 7/24/1998 | 11:00 am | 105 mg/dL | 0.0 unit BID |
| 66 | 7/30/1998 | 3:30 pm | 97 mg/dL | 0.0 unit BID |

Results show the efficacy of the low carbohydrate, high protein and moderate fat diet for the treatment of feline diabetes mellitus in this cat. Hyperglycemia (measured by blood glucose levels) was reduced to approximately normal levels, and this level was maintained without exogenous insulin after an approximate four week treatment with the diet.

Example 2

This Example demonstrates the ability of a nutritionally balanced diet of the present invention to treat a disease of abnormal carbohydrate metabolism in several cats.

A study was set up to evaluate the effect of feeding nine cats with well characterized adult-onset, insulin-dependent diabetes mellitus of at least three month's duration a nutritionally balanced diet of the present invention. Cats enrolled into the study could be of any age, any breed or mixture of breeds, either gender, and of any clinical severity except they could not be suffering from active ketoacidosis. At week 0 of the study, the cats began to be fed a nutritionally balanced diet of the present invention consisting of the canned formulation DIET 1, described in Example 1. No additional supplements, treats, table scraps, vitamins, minerals or any other nutritive substances were fed during the study. The results, to date, of the study are as follows, reported on a cat-by-cat basis:

Case 1: 12 year old spayed female DSH (domestic short hair) cat. Overweight at 16 pounds. Diagnosed with diabetes mellitus two years ago. Started insulin injections 18 months ago. Prior to the start of the study, this cat was receiving 5 IU NPH insulin twice daily and was eating HILL'S PRESCRIPTION DIET FELINE WAD. At the beginning of the study, the cat was taken off insulin; after two weeks on DIET 1, the cat exhibited stable blood glucose levels between 150 and 250 mg glucose per dL blood and showed clinical improvement.

Case 2: 16 year old male castrate, non-obese DSH cat. Diagnosed with diabetes mellitus one year ago. On 2 IU NPH insulin twice daily prior to entering study and was eating HILL'S SCIENCE DIET FELINE MAINTENANCE. After a 3 week treatment with DIET 1, this cat was maintaining normal blood glucose levels without exogenously administered insulin.

Case 3: 9 year old male castrate, non-obese, domestic long hair, cat. Diagnosed with diabetes mellitus one year ago. Prior to the start of the study, this cat was treated twice daily with 3 IU NPH insulin and was eating Ralston Purina's CAT CHOW. After two weeks on DIET 1, this cat maintained normal blood glucose levels with a reduced treatment of 1 IU NPH insulin.

Case 4: 10 year old male castrate, non-obese, Siamese cat. Diagnosed with diabetes mellitus 6 months ago. Prior to the start of the study, this cat was treated twice daily with 8 IU NPH insulin and was eating HILL'S PRESCRIPTION DIET FELINE W/D. When DIET 1 was started, all insulin treatment was stopped; and after two weeks on the study diet, this cat was maintaining a normal blood glucose level.

Case 5: 14 year old male castrate DSH cat. Diagnosed with diabetes mellitus two months ago. Prior to the start of the study, this cat was treated twice daily with 5 IU NPH insulin and was eating HILL'S SCIENCE DIET FELINE MAINTENANCE. After two weeks on DIET 1, this cat was maintaining normal blood glucose levels without exogenous insulin.

Case 6: 13 year old male castrate Siamese cat. Moderately overweight at 13 pounds. Diagnosed with diabetes mellitus 6 months ago. Prior to the start of the study, this cat was receiving 8 IU NPH insulin twice daily and was eating HILL'S PRESCRIPTION DIET FELINE W/D. After 3 weeks on DIET 1, this cat was maintaining a normal blood glucose level with a reduced treatment of 4 IU NPH insulin twice daily.

Case 7: 14 year old male castrate DSH cat. Diagnosed with diabetes mellitus 3 years ago. Prior to the start of the study, this cat was treated twice daily with 6 IU NPH insulin and was eating HILL'S PRESCRIPTION DIET FELINE W/D. After one week on DIET 1, this cat was maintaining a normal blood glucose level with a reduced treatment of 1 IU NPH insulin twice daily.

Case 8: Approximately 10–12 year old male castrate domestic long hair cat. Diagnosed with diabetes mellitus 2 years ago. On varying dosages of NPH insulin, ranging from 2–6 IU twice daily and was eating a variety of commercial grocery store cat foods. After one week on DIET 1, this cat was maintaining a normal blood glucose level with no exogenously administered insulin.

Case 9: 13 year old male castrate, slightly overweight, Balinese cat. Diagnosed with diabetes mellitus 5 months ago. Prior to start of study, this cat was receiving 6 IU ULTRA LENTE insulin twice daily and was eating Waltham, CNM UR, and Nestle's FRISKIES. After 3 weeks on DIET 1, this cat still required the same amount of insulin (6 IU) to maintain a normal blood glucose level, although this cat has shown better control and lower blood glucose levels than prior to the beginning of the study.

Case 10: 14 year old spayed female, DSH cat. Underweight at 6.6 pounds. Diagnosed with diabetes mellitus 3 years ago. Prior to the start of the study, this cat was receiving 6 IU NPH insulin twice daily and was eating HILL'S PRESCRIPTION DIET FELINE W/D. After 3 weeks on DIET 1, this cat was maintaining approximately normal blood glucose levels on a reduced amount of insulin, 1 IU, twice daily.

Case 11: 16 year old male castrate, non-obese, DSH cat. Diagnosed with diabetes mellitus 2 years ago. Prior to the start of the study, this cat was receiving 5 IU ULTRA LENTE insulin twice daily and was eating HILL'S PRESCRIPTION DIET FELINE W/D. After 3 weeks on DIET 1, this cat was maintaining an approximately normal blood glucose level with a 0.5–0.8 IU ULTRA LENTE insulin twice daily.

Case 12: 8 year old male castrate DSH cat. Moderately overweight at 14 pounds. Diagnosed with diabetes mellitus 2 months ago. This cat was not receiving exogenous insulin injections, and had a blood glucose level in the 400 mg/dL range, and was eating IAMS cat foods and FRISKIES. After 1 week on DIET 1, this cat's blood glucose level dropped to approximately 300 mg/dL.

During the study, all cats ate the study diet well but did not show a tendency to overeat or to gain weight, except for the cat in case 10 who gained 0.5 pounds. All cats showed clinical improvement. These results indicate that a nutritionally balanced diet including low carbohydrate, high protein, moderate fat of the present invention improved the condition of cats suffering from diabetes.

Example 3

This example demonstrates the ability to produce a dry food formulation of a nutritionally balanced diet of the present invention.

A dry nutritionally balanced diet, defined as 4.77% carbohydrate, 32.4% fat, and 44.98% protein with the remainder of the composition being 5.51% ash, 10.94% moisture, and 1.4% fiber, was prepared as follows. A sample of DIET 1 was slowly dried and baked such that a starting moisture content of 25% to 35% was reduced to a moisture content of about 10%. The moist composition was spread on a tray, and placed in a 225° F convection oven for three to three and one half hours, uncovered. The mixture was stirred once an hour during the drying process. After drying was complete, the mixture was cooled slowly for approximately one hour before being packaged.

Example 4

This example demonstrates the ability of a nutritionally balanced diet of the present invention to treat a disease of abnormal carbohydrate metabolism in several diabetic cats. This study was continued over several months.

A baseline glucose curve was taken and the cats were then switched to DIET 1, as described in Example 1. Glucose curves were performed in the following manner: each cat is fasted, and has no insulin injections for 12 hours. At time 0, the cat is given insulin and fed. A blood sample is taken every two hours following for ten hours, and the glucose amount is determined at each time point. In a normal cat, the glucose level of approximately 100 mg/dl will normally rise slightly upon food consumption, then drop slightly below 100 in response to the insulin released in response to the blood sugar rise. The blood glucose level should then return to normal.

| | | | | Cat 1 "Sol" Akers | | | | | |
|---|---|---|---|---|---|---|---|---|---|
| hour | baseline 3/1/98 | Start diet 8/7/98 | 8/24/98 | 9/10/98 | 10/5/98 | 10/20/98 | 1/9/99 | 3/26/99 |
| 8:00 am | 460 | 192 | 578 | 111 | 318 | 50 | 443 | 270 |
| 10:00 am | 447 | 73 | 431 | 58 | 402 | 40 | 398 | 410 |
| 12:00 am | 487 | 69 | 410 | 61 | 311 | 36 | 333 | 449 |
| 2:00 pm | 418 | 76 | 399 | 70 | 262 | 35 | 319 | 427 |
| 4:00 pm | 437 | 196 | 320 | 96 | 251 | 50 | 300 | 494 |
| 6:00 pm | 445 | 160 | 334 | 100 | 230 | N/D | N/D | N/D |
| insulin | 8 units BID | 4 units BID | 3 units BID | 4 units BID | 3 units BID | 5 units BID | 3 units BID | 11 units BID |

This cat was taken off the study diet on February 16, 1999 due to recurrent pancreatitis. Before starting the study diet, this cat required 8 units of exogenously administered insulin to maintain blood glucose under 500 mg/dl. However, for the first few months after the initiation of the study diet, this cat's glucose level was maintained at lower levels, allowing for a reduction of administered insulin. However, this cat lost its ability to maintain a stable blood glucose level, most probably due to pancreatitis.

| | | | | Cat 2 "Scruffy" Hudson | | | | | |
|---|---|---|---|---|---|---|---|---|---|
| hour | Baseline 7/1/98 | Start diet 8/14/98 | 9/1/98 | 9/30/98 | 10/15/98 | 11/5/98 | 1/21/99 | 5/13/99 |
| 8:00 am | 219 | 47 | 84 | 86 | 117 | 110 | 107 | 93 |
| 10:00 am | 342 | 88 | 107 | 96 | 137 | 91 | 96 | 100 |
| 12:00 am | 260 | 183 | 89 | 74 | 89 | 90 | 73 | 102 |
| 2:00 pm | 109 | 213 | 101 | 68 | 79 | 81 | 66 | 106 |
| 4:00 pm | 116 | 33 | 80 | 73 | 84 | 95 | 98 | 104 |
| 6:00 pm | 150 | 160 | 100 | N/D | N/D | N/D | N/D | N/D |
| insulin | 6 units BID | 1 unit BID | 0 units BID | 0 units BID | 0 units BID | 0 units BID | 0 units BID | 0 units BID |

Before starting the study diet, this cat required 6 units of exogenously administered insulin to maintain a blood glucose level of 109–342 mg/dl. Upon starting the study diet, this cat was maintaining normal blood glucose levels with no exogenously administered insulin after an approximately 2-week treatment with the study diet. The cat has maintained normal blood glucose levels for approximately 9 months while being fed the study diet.

| Cat 3 "Ollie" Moozakis | | | | | | | | |
|---|---|---|---|---|---|---|---|---|
| hour | Baseline 7/1/98 | Start diet 8/11/98 | 8/24/98 | 9/9/98 | 9/23/98 | 10/5/98 | 11/2/98 | 1/28/99 |
| 8:00 am | 160 | 80 | 99 | 82 | 84 | 87 | 84 | 93 |
| 10:00 am | 130 | 28 | 63 | 79 | 100 | 82 | 100 | 83 |
| 12:00 am | 150 | 63 | 78 | 85 | 78 | 84 | 88 | 79 |
| 2:00 pm | 165 | 79 | 82 | 85 | 80 | 96 | 78 | 86 |
| 4:00 pm | 180 | 75 | 83 | 87 | 82 | 91 | 85 | 83 |
| 6:00 pm | 155 | 90 | N/D | N/D | N/D | N/D | N/D | N/D |
| insulin | 2 units BID | 1 unit BID | 0 units BID | 0 units BID | 0 units BID | 0 units BID | 0 units BID | 0 units BID |

This cat was removed from the study due to poor dietary compliance. Before starting the study diet, this cat was able to maintain a blood glucose level of 130–180 with 2 units of exogenously administered insulin. Upon starting the diet, until removal from the study, the cat maintained normal blood glucose levels without exogenously administered insulin.

| Cat 4 "Mabby" Couturier | | | | | | | | |
|---|---|---|---|---|---|---|---|---|
| hour | Baseline 8/14/98 | Start diet 8/15/98 | 8/28/98 | 9/11/98 | 9/25/98 | 10/16/98 | 10/23/98 | 4/23/99 |
| 8:00 am | 232 | 170 | 296 | 233 | 268 | 320 | 162 | 144 |
| 10:00 am | 184 | 150 | 280 | 225 | 342 | 301 | 96 | 111 |
| 12:00 am | 80 | 147 | 249 | 253 | 292 | 278 | 82 | 120 |
| 2:00 pm | 60 | 126 | 216 | 215 | 202 | 270 | 105 | 132 |
| 4:00 pm | 136 | 155 | 195 | 222 | 223 | 283 | 131 | 160 |
| 6:00 pm | 146 | 160 | 213 | 248 | 248 | 273 | 136 | N/D |
| insulin | 5 units BID | 3 units BID | 0 units BID | 0 units BID | 0 units BID | 0 units BID | 1 unit BID | 1 unit BID |

This cat required 5 units of insulin to maintain blood glucose under 250 mg/dl. Upon starting the study diet, this cat maintained a stable blood glucose level between 200–300 mg/dl with no exogenously administered insulin. With administration of 1 unit of insulin, this cat was able to maintain a blood glucose level in the normal range. This result represents a reduction from 5 units of administered insulin, which represents a considerable improvement in the cat's ability to regulate its blood glucose levels.

| Cat 5 "Leo" Yates | | | | | | | | | |
|---|---|---|---|---|---|---|---|---|---|
| hour | Baseline 8/15/98 | Start diet 8/24/98 | 9/10/98 | 9/24/98 | 10/8/98 | 10/22/98 | 11/5/98 | 1/16/99 | 4/19/99 |
| 8:00 am | 381 | 154 | 99 | 117 | 111 | 110 | 116 | 168.8 | 123 |
| 10:00 am | 301 | 39 | 104 | 131 | 103 | 85 | 122 | 125 | 128 |
| 12:00 am | 200 | 55 | 98 | 92 | 106 | 94 | 95 | 102 | 91 |
| 2:00 pm | 282 | 55 | 94 | 90 | 111 | 85 | 93 | 79 | 94 |

-continued

| | | | | Cat 5 "Leo" Yates | | | | | |
| --- | --- | --- | --- | --- | --- | --- | --- | --- | --- |
| hour | Baseline 8/15/98 | Start diet 8/24/98 | 9/10/98 | 9/24/98 | 10/8/98 | 10/22/98 | 11/5/98 | 1/16/99 | 4/19/99 |
| 4:00 pm | 300 | 92 | 95 | 88 | 128 | 80 | 85 | 85 | 116 |
| 6:00 pm | N/D | 94 | N/D | N/D | N/D | N/D | N/D | N/D | N/D |
| insulin | 4 units BID | 0 units BID | 0 units BID | 0 units BID | 0 units BID | 0 units BID | 0 units BID | 0 units BID | 0 units BID |

This cat required 4 units of insulin before the start of the study diet. Even with 4 units of exogenously administered insulin, blood glucose levels were high, in the 200–400 mg/dl range. Upon starting of the study diet, this cat was maintaining normal blood glucose levels without exogenously administered insulin.

| | | | Cat 6 "Koshka" Carr | | | | |
| --- | --- | --- | --- | --- | --- | --- | --- |
| hour | Baseline 8/8/98 | Start diet 8/9/98 | 8/22/98 | 9/9/98 | 10/3/98 | 10/24/98 | 1/15/99 | 3/22/99 |
| 8:00 am | 486 | 426 | 497 | 500 | 442 | 370 | 455 | 310 |
| 10:00 am | 425 | 250 | 448 | 382 | 418 | 308 | 459 | 209 |
| 12:00 am | 375 | 220 | 369 | 388 | 371 | 236 | 354 | 182 |
| 2:00 pm | 410 | 200 | 323 | 467 | 364 | 240 | 261 | 231 |
| 4:00 pm | 417 | 300 | 356 | 459 | 455 | 242 | 219 | 268 |
| 6:00 pm | 380 | 375 | 343 | N/D | N/D | N/D | N/D | N/D |
| insulin | 6 units BID | 6 units BID | 5 units BID | 6 units BID | 6 units BID | 8 units BID | 8 units BID | 9 units BID |

This cat required 6 units of insulin to maintain a blood glucose level under 500 mg/dl before the start of the study diet. Upon start of the study diet, the required insulin dosage was briefly lowered to 5 units; however, the cat was not able to maintain a lower blood glucose level and the administered insulin dosage was increased. The study diet did not have an apparent effect on the blood glucose levels of this cat.

| | | | Cat 7 "Frosty" Sharkoff | | | | |
| --- | --- | --- | --- | --- | --- | --- | --- |
| hour | Baseline 8/11/98 | Start diet 8/12/98 | 8/29/98 | 9/13/98 | 9/27/98 | 10/10/98 | 10/31/98 | 1/23/99 | 3/6/99 |
| 8:00 am | 584 | 380 | 35 | 101 | 71 | 76 | 89 | 74 | 79 |
| 10:00 am | 432 | 300 | 21 | 71 | 69 | 82 | 93 | 73 | 72 |
| 12:00 am | 231 | 265 | 51 | N/D | 74 | 79 | N/D | 78 | 68 |
| 2:00 pm | 146 | 179 | 58 | N/D | 72 | 75 | N/D | 49 | 76 |
| 4:00 pm | 126 | 120 | 70 | N/D | N/D | N/D | N/D | N/D | N/D |
| 6:00 pm | 148 | 180 | 85 | N/D | N/D | N/D | N/D | N/D | N/D |
| insulin | 6 units BID | 3 units A.M. | 1 unit BID | 0 units BID | 0 units BID | 0 units BID | 0 units BID | 0 units BID | 0 units BID |

This cat required 6 units of insulin to maintain a blood glucose level below 584 mg/dl before feeding the study diet. Upon start of the study diet, this cat was maintaining normal blood glucose levels without exogenously administered insulin after a 4-week treatment with the study diet.

| | Cat 8 "Cassatt" Lambersor | | | | |
|---|---|---|---|---|---|
| hour | Baseline 8/3/98 | Start diet 8/5/98 | 8/24/98 | 8/31/98 | 10/20/98 |
| 8:00 am | 467 | 450 | 358 | 344 | 380 |
| 10:00 am | 460 | N/D | 349 | 309 | 294 |
| 12:00 am | 434 | N/D | 318 | 268 | 208 |
| 2:00 pm | 406 | 20 | 322 | 325 | 237 |
| 4:00 pm | 422 | 70 | 302 | 348 | 290 |
| 6:00 pm | 420 | 80 | 304 | 356 | 310 |
| insulin | 6 units BID | 6 units A.M. | 0.3 units BID | 0.8 units BID | 1.5 units BID |

This cat, before the start of the study diet, required 6 units of insulin to maintain a blood glucose level between 400 and 467 mg/dl. After two weeks on the study diet, this cat was maintaining stable blood glucose between 200 and 380 mg/dl with greatly reduced dosages of insulin, ranging from 0.3 units to 1.5 units.

| | Cat 9 "Boots" Allen | | | | | | | | |
|---|---|---|---|---|---|---|---|---|---|
| hour | Baseline 3/1/98 | Start diet 8/15/98 | 8/31/98 | 9/13/98 | 9/27/98 | 10/19/98 | 11/1/98 | 1/10/99 | 4/26/99 |
| 8:00 am | 335 | 184 | 72 | 105 | 99 | 76 | 87 | 103 | 97 |
| 10:00 am | 189 | 147 | 81 | 102 | 113 | 87 | 83 | 84 | 96 |
| 12:00 am | 108 | 27 | 95 | 72 | 87 | 90 | 75 | 73 | 101 |
| 2:00 pm | 148 | 52 | 91 | 74 | 93 | 82 | 78 | 78 | 107 |
| 4:00 pm | 112 | 63 | 2 | 81 | 103 | 69 | 82 | 82 | 89 |
| 6:00 pm | 201 | 73 | 85 | 91 | 98 | 77 | 85 | 85 | 72 |
| insulin | 8 units BID | 4 units A.M. | 0 units | 0 units | 0units | 0 units | 0 units | 0 units | |

This cat required 8 units of exogenously administered insulin to maintain a blood glucose level of 112 to 335 mg/dl before the start of the study. After 2 weeks on the study diet, this cat was maintaining a normal blood glucose level with no exogenously administered insulin. This cat, while on the study diet, has maintained a normal blood glucose for 8 months.

| | Cat 10 "Bobby" Blakemore | | | | | | | | |
|---|---|---|---|---|---|---|---|---|---|
| hour | Baseline 8/20/98 | Start diet 8/21/98 | 9/4/98 | 9/18/98 | 10/3/98 | 10/16/98 | 11/5/98 | 12/22/98 | 3/25/99 |
| 8:00 am | 319 | 77 | 135 | 496 | 316 | 223 | 147 | 271 | 388 |
| 10:00 am | 432 | 34 | 115 | 247 | 130 | 98 | 43 | 258 | 249 |
| 12:00 am | 231 | 48 | 76 | 41 | 127 | 76 | 43 | 200 | 68 |
| 2:00 pm | 146 | 33 | 107 | 43 | 227 | 97 | 126 | 199 | 90 |
| 4:00 pm | 229 | 229 | 209 | 78 | 468 | 167 | 150 | 185 | 95 |
| 6:00 pm | 320 | 320 | 250 | 110 | N/D | N/D | N/D | N/D | N/D |
| insulin | 4 units BID | 2units BID | 1unit BID | 1unit BID | 1 unit BID | 1unit BID | 1unit BID | 1 unit BID | |

This cat, before the start of the study, required 4 units of exogenously administered insulin to maintain blood glucose of 146 to 432. After 2 weeks on the study diet, the cat was maintaining a lower, although somewhat unstable, blood glucose level with the reduced amount of exogenously administered insulin amount of 1 unit BID.

| | Cat 11 "Alley" Kadlub | | | | |
|---|---|---|---|---|---|
| hour | Baseline 8/15/98 | Start diet 8/16/98 | 8/24/98 | 9/14/99 | 10/20/99 |
| 8:00 am | 381 | 340 | 399 | 197 | 405 |
| 10:00 am | 340 | N/D | 316 | 121 | 262 |
| 12:00 am | 310 | N/D | 313 | 52 | 125 |
| 2:00 pm | 280 | 30 | 293 | 125 | 134 |
| 4:00 pm | 300 | 50 | 359 | 201 | 354 |
| 6:00 pm | 320 | 65 | 373 | 272 | 376 |
| insulin | 4 units BID | 4 units A.M. | 0.5 units BID | 1.2 units BID | 1 unit BID |

This cat before the start of the study, required 4 units of exogenously administered insulin to maintain a blood glucose level of 280–380 mg/dl. After 4 weeks on the study diet, the cat was maintaining a lower, if somewhat unstable, blood glucose level with the reduced amount of exogenously administered insulin amount of 1 unit BID.

In this Example, the study diet containing reduced carbohydrate (6.9% on a dry matter basis) was shown to be effective in reducing cat's dependence on insulin to regulate its blood glucose level. Out of 11 cats in the study, 4 of the 11 were able to maintain normal blood glucose levels without exogenously administered insulin, 4 of the 11 were able to maintain lower blood glucose levels with a reduced amount of exogenously administered insulin, 2 of 11 were dropped from the study (as noted), and for one of the 11 cats, the study diet did not appear to have any effect on blood glucose levels or dependence on insulin.

a higher protein content and lower fat content than the diet used previously.

Cats were fed Hill's Prescription Diet W/D, referred to herein as the baseline diet, prior to starting on the study diet. A baseline glucose curve was taken while cats were being fed Hill's Prescription Diet W/D. Cats were then switched to the study diet, referred to herein as DIET 2, which was a wet canned food. The analysis of DIET 2 is as follows: 74% moisture; 16.3% protein; 6.42% fat (by acid hydrolysis); 0.7% crude fiber; 2.06% ash; and 0.52% carbohydrate. On a dry matter basis, by calculation, protein makes up 62.7% of the diet formulation; fat makes up 24.7% of the diet formulation; fiber makes up 2.7% of the diet formulation; ash makes up 7.9% of the formulation; and carbohydrate makes up 2% of the diet formulation.

Glucose curves were performed in the manner described in Example 4.

| | Cat 1 "Maggie" Radman Started baseline diet on 2/7/99 and DIET 2 on 4/3/99 | | | | | |
|---|---|---|---|---|---|---|
| Hours post start of curve | 1/25/99 | 2/20/99 | 3/6/99 | 4/2/99 | 5/17/99 | 6/29/99 |
| 0 | 146 | 287 | 120 | 140 | 106 | 135 |
| 2 | 60 | 275 | 166 | 145 | 129 | 101 |
| 4 | 98 | 112 | 87 | 84 | 87 | 110 |
| 6 | 108 | 114 | 85 | 88 | 108 | 113 |
| 8 | 131 | 117 | 85 | 100 | 128 | 116 |
| 10 | N/D | 163 | 133 | 141 | N/D | 157 |
| 12 | N/D | N/D | N/D | N/D | N/D | 123 |
| INSULIN AMOUNT | 4 units BID | 2 units BID | 2 units BID | 2 units BID | 0 units | 0 units |
| WT OF CAT (LB) | 10.84 | 10.5 | 10.1 | 10 | 10 | 9.2 |

Example 5

This example demonstrates the ability of a nutritionally balanced diet of the present invention to treat a disease of abnormal carbohydrate metabolism in several diabetic cats. The diet used in this Example is different from the diets used in the previous Examples; in this Example, the diet contains This cat, before the start of the study diet, required 4 units of insulin to maintain a normal blood glucose level. After initiation of the study diet, normal blood glucose levels were maintained without administration of exogenous insulin.

This cat lost 1.64 lbs while on the study diet, for a loss of 15% of its body weight.

| Cat 2 "Sylvester" Hernandez Started baseline diet on 2/7/99 and DIET 2 on 4/7/99 | | | | | | | |
|---|---|---|---|---|---|---|---|
| Hours post start of curve | 2/6/99 | 2/20/99 | 3/6/99 | 4/6/99 | 5/1/99 | 5/22/99 | 7/2/99 |
| 0 | 323 | 282 | 410 | 216 | 311 | 290 | 174 |
| 2 | 335 | 283 | 360 | 254 | 90 | 211 | 59 |
| 4 | 350 | 68 | 208 | 225 | 184 | 151 | 56 |
| 6 | 314 | 47 | 61 | 97 | 290 | 133 | 57 |
| 8 | 292 | 96 | 59 | 106 | 390 | 164 | 85 |
| 10 | 221 | 162 | 121 | 121 | N/D | 237 | N/D |
| 12 | N/D | N/D | N/D | N/D | N/D | N/D | N/D |
| INSULIN AMOUNT | 5 units BID | 5 units BID | 5 units BID | 5 units BID | 3 units BID | 3 units BID | 4 units BID |
| WT OF CAT (LB) | 12.85 | 12.6 | 12.2 | N/D | 12.6 | 13.2 | 12.7 |

This cat, before the start of the study diet, required 5 units of insulin to maintain a blood glucose level of 221 to 350 mg/dl. After initiation of the study diet, lower blood glucose levels (mostly within the normal range) were maintained with a lower dose (3 to 4 units) of exogenously administered insulin.

This cat lost minimal weight during the study; the loss amounted to only about 1.1% of its body weight.

This cat, before the start of feeding the study diet, required 5 units of insulin to maintain a blood glucose level of 213 to 392 mg/dl. After initiation of the study diet, lower blood glucose levels (from 232 to 315 mg/dl) were maintained with a reduced insulin dosage of 1.75 units.

This cat lost weight during the study; at the last data point, the cat had lost 2.55 lbs, for a loss of 14.7% of its body weight.

| Cat 3 "Bud" Moore Started baseline diet on 2/7/99 and DIET 2 on 4/4/99 | | | | | | | |
|---|---|---|---|---|---|---|---|
| Hours post start of curve | 2/6/99 | 2/20/99 | 3/6/99 | 4/2/99 | 4/4/99 | 5/15/99 | 6/28/99 |
| 0 | 392 | 302 | 253 | 369 | 154 | 298 | 315 |
| 2 | 374 | 283 | 370 | 353 | 107 | 332 | 294 |
| 4 | 246 | 237 | 342 | 338 | 85 | 338 | 287 |
| 6 | 213 | 243 | 361 | 341 | 43 | 343 | 232 |
| 8 | 252 | 249 | 360 | 258 | 99 | 364 | 253 |
| 10 | 262 | 300 | 340 | 325 | 325 | 390 | 253 |
| 12 | N/D | N/D | N/D | N/D | N/D | N/D | 296 |
| INSULIN AMOUNT | 5 units BID | 5 units BID | ? BID | 3.5 units BID | 2 units BID | 2 units BID | 1.75 units BID |
| WT OF CAT (LB) | 17.3 | 17.1 | N/D | N/D | N/D | N/D | 14.75 |

| Cat 4 "PJ" Womack Started baseline diet on 2/7/99 and DIET 2 on 4/3/99 | | | | | |
|---|---|---|---|---|---|
| Hours post start of curve | 2/6/99 | 2/20/99 | 4/2/99 | 5/14/99 | 6/26/99 |
| 0 | 154 | 139 | 144 | 136 | 96 |
| 2 | 102 | 146 | 109 | 165 | 92 |
| 4 | 84 | 31 | 75 | 122 | 102 |
| 6 | 74 | 55 | 87 | 101 | 81 |
| 8 | 135 | 91 | 100 | 79 | 96 |
| 10 | 179 | 115 | 103 | 96 | N/D |
| INSULIN AMOUNT | 5 units BID | 3 units BID | 1 unit BID | 0 units | 0 units |
| WT OF CAT (LB) | 16.8 | 16.5 | 15.25 | 14 | 13.8 |

This cat, before the start of study diet, required 5 units of insulin to maintain a blood glucose level in the normal range. After initiation of the study diet, this cat exhibited the ability to maintain a normal blood glucose level without administration of exogenous insulin.

This cat lost weight during the study; at the last data point, the cat had lost 3 lbs, for a loss of 17.9% of its body weight.

| Cat 5 "Sparky" Ovitt Started baseline diet on 2/3/99 and DIET 2 on 3/31/99 | | | | | |
|---|---|---|---|---|---|
| Hours post start of curve | 12/14/98 | 2/17/99 | 3/9/99 | 5/12/99 | 7/8/99 |
| 0 | 99 | 16 | 24 | 18 | 26 |
| 2 | 66 | 20 | 21 | 50 | 69 |
| 4 | 152 | 69 | 26 | 77 | 76 |
| 6 | 192 | 99 | 68 | 84 | 86 |
| 8 | 182 | 87 | 122 | 85 | 72 |
| 10 | 180 | 108 | 96 | 70 | 75 |
| INSULIN AMOUNT | 2.5 NPH units BID | 2.5 units BID | 2.5 unit BID | 1 units BID | 1 units BID |
| WT OF CAT (LB) | 12.8 | 12.4 | 12 | 11.8 | 11.5 |

This cat, before the start of the study diet, required 2.5 units of insulin to maintain a normal blood glucose level. After initiation of the study diet, this cat was able to maintain a normal blood glucose level at a reduced insulin dosage of 1 unit.

This cat lost weight during the study; at the last data point, the cat had lost 1.3 lb, for a loss of 10% of its body weight.

| Cat 6 "Peter" Ovitt Started baseline diet on 2/3/99 and DIET 2 on 3/31/99 | | | | |
|---|---|---|---|---|
| Hours post start of curve | 2/17/99 | 3/17/99 | 5/7/99 | 7/8/99 |
| 0 | 260 | 273 | 16 | 17 |
| 2 | 240 | 288 | N/D | 24 |
| 4 | 143 | 312 | 26 | 62 |
| 6 | 121 | 301 | 70 | 78 |
| 8 | 103 | 307 | 104 | 108 |
| 10 | 88 | 324 | 129 | 125 |
| INSULIN AMOUNT | 2 units BID | 2 units BID | 5 unit BID | 4.5 units BID |
| WT OF CAT (LB) | 11.7 | 11.7 | 11.6 | 13.4 |

This cat, before the start of the study diet, required 2 units of insulin to maintain a blood glucose level ranging from 88 to 260 mg/dl. After initiation of the study diet, this cat's insulin level was increased to bring down the blood glucose into the normal range. An effect of the study diet on allowing the cat to maintain a lower blood glucose level with a lower dosage of insulin is not apparent in this cat.

This cat did not lose weight during the study; it had, by the last data point, gained 1.7 lbs, for a gain of 14.5% of its body weight.

| Cat 7 "Sassie" Bailey Started baseline diet on 2/3/99 and DIET 2 on 3/31/99 | | | | | | |
|---|---|---|---|---|---|---|
| Hours post start of curve | 12/13/98 | 2/9/99 | 3/10/99 | 3/30/99 | 5/11/99 | 7/7/99 |
| 0 | 187 | 156 | 219 | 255 | 357 | 150 |
| 2 | 158 | 123 | 145 | 277 | 253 | 86 |
| 4 | 99 | 80 | 63 | 213 | 179 | 58 |

-continued

Cat 7 "Sassie" Bailey Started baseline diet on 2/3/99 and DIET 2 on 3/31/99

| Hours post start of curve | 12/13/98 | 2/9/99 | 3/10/99 | 3/30/99 | 5/11/99 | 7/7/99 |
|---|---|---|---|---|---|---|
| 6 | 100 | 82 | 132 | 133 | 191 | 138 |
| 8 | 165 | 78 | 212 | 15 | 209 | 186 |
| 10 | 201 | 74 | 210 | 136 | 214 | 206 |
| INSULIN AMOUNT | 4 units BID | 4 units BID | 4 units BID | 4 units BID | 4 units BID | 3 units BID |
| WT OF CAT (LB) | 11.5 | 11.5 | 11.8 | 11.8 | 11.4 | N/D |

This cat, before the start of the study diet, required 4 units of insulin to maintain a normal blood glucose level. After initiation of study diet, this cat was able to maintain a normal blood glucose level with a reduced amount of insulin (3 units).

This cat maintained its weight during the study.

Cat 8 "Daisy" Stender Started baseline diet on 2/2/99 and DIET 2 on 3/2/99

| Hours post start of curve | 1/29/99 | 2/18/99 | 3/2/99 | 3/9/99 | 3/23/99 | 4/7/99 | 5/4/99 | 5/25/99 |
|---|---|---|---|---|---|---|---|---|
| 0 | 87 | 40 | 36 | 65 | 88 | 68 | 66 | 73 |
| 2 | 79 | 54 | 29 | 57 | 61 | 48 | 65 | 86 |
| 4 | 56 | 72 | 26 | 46 | 41 | 89 | 74 | 78 |
| 6 | 54 | 48 | 36 | 38 | 66 | 102 | 67 | 73 |
| 8 | 70 | 55 | 37 | 61 | 42 | 74 | 65 | 71 |
| 10 | 69 | 69 | 54 | 58 | 42 | N/D | 74 | 67 |
| INSULIN AMOUNT | 4 units BID | ? | 2 units BID | 0 | 0 | 0 | 0 | 0 |
| WT OF CAT (LB) | 17.4 | N/D | N/D | N/D | N/D | N/D | N/D | 15.2 |

This cat, before the start of the study diet, required 4 units of insulin to maintain a normal blood glucose level. After initiation of the study diet, this cat was able to maintain a normal blood glucose level without exogenously administered insulin.

This cat lost weight during the study; at the last data point, the cat had lost 2.2 lb, for a loss of 12.6% of its body weight.

Cat 9 "Bud" Price Started baseline diet on 2/2/99 and DIET 2 on 3/2/99

| Hours post start of curve | 1/29/99 | 2/18/99 | 3/2/99 | 3/9/99 | 3/23/99 | 4/7/99 | 5/4/99 | 5/25/99 |
|---|---|---|---|---|---|---|---|---|
| 0 | 143 | 233 | 85 | 137 | 329 | 209 | 168 | 171 |
| 2 | 120 | 337 | 36 | 196 | 358 | 59 | 256 | 167 |
| 4 | 303 | 137 | 39 | 232 | 295 | 36 | 111 | 96 |
| 6 | 313 | 45 | 25 | 155 | 260 | 14 | 87 | 81 |
| 8 | 370 | 70 | 51 | 217 | 308 | 172 | 87 | 90 |
| 10 | 388 | 86 | 50 | 211 | 274 | N/D | 111 | 95 |
| INSULIN AMOUNT | 6 units BID | 5 units BID | 4 units BID | 0 units | 0 units | 2 units BID | 1 unit BID | 1 unit BID |
| WT OF CAT (LB) | 17.8 | N/D | N/D | N/D | N/D | N/D | 13.7 | 13.5 |

This cat, before the start of the study diet, required 6 units of insulin to maintain a blood glucose level in the range of 120–388 mg/dl. After initiation of the study diet, this cat was able to maintain a normal blood glucose level with a reduced level of administered insulin (I unit).

This cat lost weight during the study; at the last data point, the cat had lost 4.3 lbs, for a loss of 24.1% of its body weight.

| Cat 10 "Tom" McBride Started baseline diet on 2/2/99 and DIET 2 on 3/2/99 | | | | | |
|---|---|---|---|---|---|
| Hours post start of curve | 1/29/99 | 2/18/99 | 3/2/99 | 3/23/99 | 4/13/99 |
| 0 | 212 | 377 | 256 | 346 | 356 |
| 2 | 229 | 275 | 48 | 218 | 210 |
| 4 | 161 | 229 | 36 | 185 | 170 |
| 6 | 47 | 256 | 21 | 238 | 235 |
| 8 | 69 | 301 | 54 | 245 | 294 |
| 10 | 187 | 303 | 181 | 289 | N/D |
| INSULIN AMOUNT | 4 units BID | 4 units BID | 3 units BID | 4 units BID | 4 units BID |
| WT OF CAT (LB) | 14.6 | N/D | 14.25 | N/D | N/D |

This cat, before the start of the study diet, required 4 units of insulin to maintain a blood glucose level in the range of 47 to 230 mg/dl. After initiation of the study diet, this cat still required 4 units of insulin to maintain its blood glucose in approximately the same range. An effect of the study diet on the cat's ability to maintain its blood glucose with lower dosing of insulin is not apparent in this cat.

This cat's weight was not recorded at the last two data points. However, the data points captured indicate that this cat is maintaining its weight on the study diet.

| Cat 11 "Sammy" Miller Started baseline diet on 2/2/99 and DIET 2 on 3/2/99 | | | | | | | |
|---|---|---|---|---|---|---|---|
| Hours post start of curve | 1/29/99 | 2/18/99 | 3/2/99 | 3/9/99 | 3/23/99 | 5/4/99 | 5/25/99 |
| 0 | 57 | 73 | 96 | 71 | 106 | 68 | 75 |
| 2 | 139 | 60 | 74 | 80 | 85 | 83 | 69 |
| 4 | 165 | 42 | 54 | 69 | 66 | 61 | 97 |
| 6 | 149 | 23 | 51 | 54 | 42 | 76 | 78 |
| 8 | 116 | 56 | 47 | 21 | 54 | 96 | 83 |
| 10 | 117 | 68 | 57 | 49 | 83 | 75 | 76 |
| INSULIN AMOUNT | 5 units BID | 4 units BID | 4 units BID | 0 units BID | 0 | 0 | 0 |
| WT OF CAT (LB) | 14.9 | N/D | N/D | 15.4 | 14.8 | 14.9 | 14.2 |

This cat, before the start of the study diet, required 5 units of insulin to maintain a normal blood glucose level. After initiation of the study diet, this cat was able to maintain a normal blood glucose level without exogenously administered insulin.

This cat's weight stayed relatively constant throughout the study.

| Cat 12 "Spooky" Coit Started baseline diet on 2/2/99 and DIET 2 on 3/2/99 | | | | | | | |
|---|---|---|---|---|---|---|---|
| Hours post start of curve | 2/2/99 | 2/18/99 | 3/2/99 | 3/9/99 | 4/13/99 | 5/4/99 | 5/25/99 |
| 0 | 89 | 110 | 220 | 209 | 306 | 283 | 58 |
| 2 | 70 | 105 | 200 | 124 | 274 | 177 | 38 |
| 4 | 175 | 74 | 72 | 66 | 192 | 48 | 81 |
| 6 | 354 | 180 | 35 | 16 | 144 | 40 | 67 |
| 8 | 455 | 245 | 51 | 78 | 129 | 72 | 91 |
| 10 | 453 | 210 | 94 | 81 | 190 | 62 | N/D |
| INSULIN AMOUNT | 9 units BID | 9 units BID | 4 units BID | 4 units BID | 2 units BID | 3 units BID | 2 units BID |
| WT OF CAT (LB) | 12.5 | N/D | 13.25 | N/D | N/D | N/D | N/D |

This cat, before the start of the study diet, required 9 units of insulin to maintain a blood glucose level that ranged from 70 to 453 mg/dl. After initiation of the study diet, by the last time point this cat was able to maintain a normal blood glucose level with a much reduced dosage of insulin (2 units).

This cat's weight was not recorded throughout the study, therefore no conclusions are drawn with regarding to weight.

| Cat 13 "Punkin" Kunze Started baseline diet on 2/1/99 and DIET 2 on 3/1/99 | | | | | |
|---|---|---|---|---|---|
| Hours post start of curve | 12/21/98 | 2/15/99 | 3/1/99 | 4/12/99 | 5/14/99 |
| 0 | 306 | 116 | 208 | 321 | 275 |
| 2 | 322 | 98 | 268 | 339 | 338 |
| 4 | 268 | 126 | 258 | 332 | 335 |
| 6 | 229 | 162 | 266 | 323 | 328 |
| 8 | 278 | 183 | 276 | 299 | 240 |
| 10 | N/D | 206 | 257 | 307 | 306 |
| INSULIN AMOUNT | 3 units BID | 3 units BID | 0 | 0 | 0 |
| WT OF CAT (LB) | 10.7 | 11.46 | 12.24 | 11.04 | 10.12 |

This cat, before the start of the study diet, required 3 units of insulin to maintain its blood glucose level of 278 to 322 mg/dl. After initiation of the study diet, by the last time point this cat was able to maintain a blood glucose level in approximately the same range without administered insulin.

This cat's weight fluctuated throughout the study, but by the last time point was quite similar to the cat's weight at the beginning of the study.

| Cat 14 "Santino" Fitzpatrick Started baseline diet on 2/1/99 and DIET 2 on 3/1/99 | | | | | | |
|---|---|---|---|---|---|---|
| Hours post start of curve | 12/21/98 | 2/15/99 | 3/1/99 | 4/12/99 | 5/14/99 | 7/12/99 |
| 0 | 343 | 404 | 592 | 481 | 453 | 587 |
| 2 | 271 | 277 | 454 | 249 | 278 | 371 |
| 4 | 160 | 169 | 394 | 171 | 238 | 279 |
| 6 | 119 | 99 | 359 | 120 | 204 | 237 |
| 8 | 204 | 57 | 274 | 142 | 161 | 183 |
| 10 | N/D | 43 | 166 | 159 | 161 | 163 |
| 12 | N/D | N/D | 112 | N/D | 187 | 116 |
| INSULIN AMOUNT | 8 units BID | 10 units BID | 11 units BID | 8 units BID | 9 units BID | 10 units BID |
| WT OF CAT (LB) | 10.5 | 10.78 | 10.18 | 10.26 | 10.4 | 11.4 |

This cat, before the start of the study diet, required 8 units of insulin to maintain its blood glucose level below 350 mg,/dl. After initiation of the study diet, this cat required IO units of insulin to maintain its blood glucose in approximately the same range. An effect of the study diet on the cat's ability to maintain its blood glucose with lower dosing of insulin is not apparent in this cat.

This cat's weight fluctuated throughout the study, remaining relatively constant until the last time point, where this cat had gained 0.9 lb, a gain of 8.5% of its body weight.

| Cat 15 "Boots" Carr Started baseline diet on 2/1/99 and DIET 2 on 3/1/99 | | | | | |
|---|---|---|---|---|---|
| Hours post start of curve | 12/21/98 | 2/15/99 | 3/1/99 | 4/12/99 | 5/14/99 |
| 0 | 181 | 394 | 339 | 355 | 369 |
| 2 | 195 | 339 | 346 | 339 | 378 |
| 4 | 98 | 274 | 362 | 335 | 389 |
| 6 | 38 | 156 | 323 | 310 | 379 |
| 8 | 49 | 210 | 311 | 286 | 333 |
| 10 | 71 | 211 | 330 | 320 | 333 |
| INSULIN AMOUNT | 4 units BID | 3 units BID | 3 units BID | 0 | 0 |
| WT OF CAT (LB) | 27 | 25.22 | 25.28 | 21.66 | 19.39 |

This cat, before the start of the study diet, required 4 units of insulin to maintain its blood glucose in a normal range. After initiation of the study diet, this cat exhibited stable blood glucose levels between 333 and 389 mg per dl without exogenously administered insulin.

This cat lost weight during the study; it lost a total of 7.6 lbs, for a loss of 28.2% of its body weight.

In summary, fifteen cats were included in the study and four cats (data not shown) were removed from the study. Of the fifteen cats fed the study diet, twelve showed improvement, measured by reduction in the amount of insulin required to allow the cat to maintain a lowered blood glucose level. Three of the fifteen cats showed no improvement upon feeding of the study diet. Of the twelve cats that showed improvement, four of the cats were able to maintain normal blood glucose levels without administered insulin; two of the cats were able to maintain stable, although higher than normal blood glucose levels, without administered insulin; and six of the fifteen cats were able to maintain a normal blood glucose level with a reduced amount of administered insulin relative the amount the cat required before initiation of the study.

Seven of the fifteen cats included in the study lost weight while on the study diet. Five of the fifteen cats maintained their weight while on the study diet; and two cats gained weight on the study diet. One cat of the fifteen did not have enough recorded data points to be able to draw a conclusion about weight loss.

While various embodiments of the present invention have been described in detail, it is apparent that modifications and adaptations of those embodiments will occur to those skilled in the art. It is to be expressly understood, however, that such modifications and adaptations are within the scope of the present invention, as set forth in the following claims.

What is claimed is:

1. A method to treat an obligate carnivore for a disease of abnormal carbohydrate metabolism, said method comprising feeding said obligate carnivore a nutritionally balanced diet comprising a protein content of from about 30% to about 70% on a dry matter basis, a fat content amount of from about 10% to about 40% on a dry matter basis, and a carbohydrate content of not more than about 12% on a dry matter basis.

2. The method of claim 1, wherein said obligate carnivore is selected from the group consisting of Felids, Hyaenids, Viverrids, and obligately carnivorous Mustelids.

3. The method of claim 1, wherein said obligate carnivore is selected from the group consisting of *Felis domesticus, Felis silvestris, Panthera leo, Panthera tigris, Panthera pardus, Puma concolor, Crocuta crocuta, Hyaena hyaena*, and *Putorius furo*.

4. The method of claim 1, wherein said carbohydrate content is not more than about 6% on a dry matter basis.

5. The method of claim 1, wherein said carbohydrate content is not more than about 2% on a dry matter basis.

6. The method of claim 1, wherein said nutritionally balanced diet is selected from the group consisting of a dry diet and a wet diet.

7. A method to treat an obligate carnivore for a disease of abnormal carbohydrate metabolism, said method comprising:
(a) producing a nutritionally balanced diet comprising a protein content of from about 30% to about 70% on a dry matter basis, a fat content amount of from about 10% to about 40% on a dry matter basis, and a carbohydrate content of not more than about 12% on a dry matter basis; and
(b) feeding said diet to said obligate carnivore.

8. The method of claim 1, wherein said carbohydrate content is not more than 4% on a dry matter basis.

9. The method of claim 1, wherein said disease is selected from the group consisting of diabetes mellitus and obesity.

10. An animal food composition for treating an obligate carnivore for a disease of abnormal carbohydrate metabolism, said composition comprising a nutritionally balanced diet having a protein content of from about 30% to about 70% on a dry matter basis, a fat content amount of from about 10% to about 40% on a dry matter basis, and a carbohydrate content of not more than 6% on a dry matter basis.

11. The composition of claim 10, wherein said carbohydrate content is not more than about 4% on a dry matter basis.

12. The composition of claim 10, wherein said carbohydrate content is not more than about 2% on a dry matter basis.

13. The composition of claim 10, wherein said composition is selected from the group consisting of a dry composition and a wet composition.

14. The composition of claim 10, wherein said composition prevents development of a disease selected from the group consisting of diabetes mellitus and obesity.

15. A method to treat an obligate carnivore for a disease of abnormal carbohydrate metabolism, said method comprising feeding said obligate carnivore a nutritionally balanced food composition that comprises a percentage of carbohydrate on a dry matter basis that is not more than the highest percentage of carbohydrate on a dry matter basis that will treat said obligate carnivore for said disease of abnormal carbohydrate metabolism.

16. The method of claim 15, wherein said disease is selected from the group consisting of diabetes mellitus and obesity.

17. The method of claim 15, wherein said disease is selected from the group consisting of diabetes mellitus and obesity.

18. A method to treat an obligate carnivore for a disease selected from the group consisting of diabetes mellitus and obesity, said method comprising feeding said obligate carnivore a nutritionally balanced diet comprising a protein content of from about 30% to about 70% on a dry matter basis, a fat content amount of from about 10% to) about 40% on a dry matter basis, and a carbohydrate content of not more than about 12% on a dry matter basis.

19. A method to treat diabetes mellitus in an obligate carnivore by decreasing exogenous insulin requirements of said obligate carnivore, said method comprising feeding said obligate carnivore an animal food composition comprising a nutritionally balanced diet having a protein content of from about 30% to about 70% on a dry matter basis, a fat content amount of from about 10% to about 40% on a dry matter basis, and a carbohydrate content of not more than 12% on a dry matter basis.

20. The method of claim 19, wherein said carbohydrate content is not more than about 6% on a dry matter basis.

21. The method of claim 19, wherein said carbohydrate content is not more than about 4% on a dry matter basis.

* * * * *